INVENTOR.
Abel Marmour
BY

June 13, 1950 A. MARMOUR 2,511,646
MEANS FOR THE INSPECTION OF MICROPHOTOGRAPHIC
AND THE LIKE DOCUMENTS
Filed Aug. 7, 1947 2 Sheets-Sheet 2

INVENTOR.
Abel Marmour
BY

Patented June 13, 1950

2,511,646

UNITED STATES PATENT OFFICE 2,511,646

MEANS FOR THE INSPECTION OF MICROPHOTOGRAPHIC AND THE LIKE DOCUMENTS

Abel Marmour, Nice, France, assignor of one-half to Societe Anonyme: Societe Generale des Metaux non Ferreux, Monte Carlo Application August 7, 1947, Serial No. 767,168
In France October 5, 1946

4 Claims. (Cl. 88—24)

My invention has for its object luminous, optic and mechanical devices for the inspection and examination point by point of maps, plans, such as road maps and the like and generally speaking any microphotographic and stereomicrophotographic documents. My invention also covers the magnifying and projecting apparatuses obtained through incorporation of such devices.

Modern transportation means allow executing very long travels of several thousand miles at always increasing speeds. Such conditions constrain the driver of a terrestrial, sea-faring or aerial vehicle, or any person entrusted with its guiding towards a predetermined point to use a large number of voluminous and bulky maps or plans which makes their inspection and examination difficult and in certain cases, for instance on board automobiles and aircrafts practically impossible.

Certain arrangements have already been proposed but have been set aside by reason of the exaggerated room required with reference to the magnification obtained and to the time and care required for their correct examination and reading during the rapid progression of the vehicle, taking into account the reflexes of the driver.

My invention removes these drawbacks. It allows concentrating on a restricted area detailed maps reproducing large surfaces involving several thousand miles. The different points of these maps may be explored in succession by an optic projecting device under which said points are brought by means of a mechanical device that may be actuated by means of only two fingers while their magnified illuminated projection is easily readable without any effort by night and by day through the receiving device described hereinafter.

My invention allows exploring and inspecting in a general manner all microphotographic documents whatever may be their application.

It allows therefore the reading of microphotographic books and may lead to the birth of a new industry i. e. the edition and publication of books and documents on film carriers replacing the printing on paper executed heretofore. It also leads to an industry of stereomicrophotography through a mere modification in the receiving device.

The principal improvements disclosed hereinbelow allow executing an apparatus of a very reduced bulk, to-wit:

(a) Application of a plano-convex lens, lying parallel with the screen and allowing with a shorter projection a same magnification ratio.

(b) Application of the deflection produced by said lens in the path of the external light for obtaining a camera obscura between it and the transparent screen, which allows the reading in daylight; as a matter of fact, in the absence of such a lens, the projecting light and day-light would blot one another out and the reading of the map would be possible only by night. On the contrary, the outer light would not be objectionable with the insertion of such a lens unless it were to arrive perpendicularly to the plano-convex lens in which case it would be cut off by the user whose head lies of necessity in the optic axis of the device when he is reading the map.

(c) Location of the map in a plane perpendicular to the screen.

(d) Projecting beam defined by a set of prisms or mirrors.

(e) Special mechanical system bringing each point to be explored on the map under the projecting system.

(f) General map termed guiding or itinerary map that enters the field of vision or recedes as desired under the action of a suitable mechanical device.

(g) Stereoscopic receiver.

Further arrangements are added to the above mentioned improvements for forming apparatuses that operate in a perfect manner.

Lastly, modifications brought to said arrangements and described hereinafter increase the possibilities of application of said apparatus.

In accompanying drawings given out by way of examples and by no means in a limiting sense, I have illustrated a number of forms of execution of my invention. In said drawings.

Figure 1:
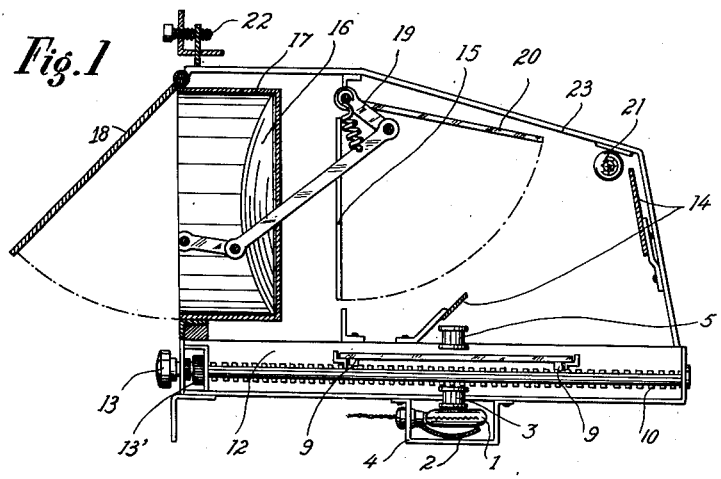
Fig. 1 is a side view of an apparatus wherein the microphotographic documents are illuminated directly through transparency and the projection is reflected by a set of mirrors.
Figure 2:
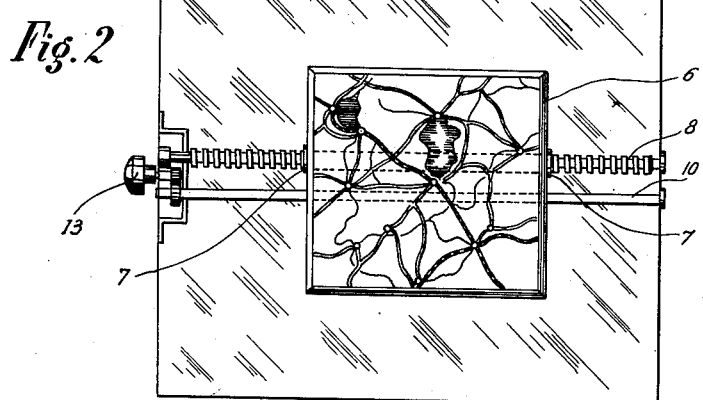
Fig. 2 illustrates the mechanism for the displacement in the transversal and longitudinal directions of the microphotographic document.
Figure 3:
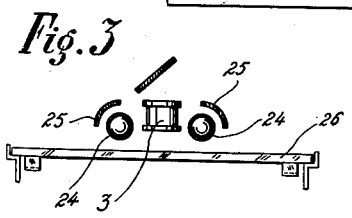
Fig. 3 shows an arrangement for illuminating an opaque document through reflection of a luminous beam.

The apparatus according to my invention, as illustrated in Figs. 1 and 2, includes the following arrangements that are associated to form an indivisible unit:

(A) An illuminating arrangement including a projection lamp 1 inserted between the parabolic mirror 2 and a double condenser 3. The system is contained inside a lantern 4 provided with aeration passages so as to form a small sized unit.

(B) A projecting device including a short focus highly luminous object-glass 5 located in a manner such that its optic axis may lie in alignment with the axis of the illuminating means and of a system of mirrors 14 adapted to reduce the bulk of the projecting means.

(C) A mechanical arrangement for feeding transversally and longitudinally a transparent microphotographic document in a plane perpendicular to the axis of the object glass, between the latter and the illuminating means.

This mechanical arrangement includes a mechanical frame 6 adapted to receive the map or like document and moving longitudinally under the action of the nut 7 screwed over the micrometric screw 8 and in a lateral direction by means of a rack 9 engaging a longitudinal fluted rod 10; the whole is enclosed inside a drawer 11 and the frame 6 moves in its plane underneath the upper surface 12 of the drawer.

The movement is controlled from the outside through a single knob 13 controlling the micrometric worm 8 or the rod 10 with rectilinear flutings forming a sort of rack pinion, said knob controlling directly a small gear adapted to engage selectively the worm or rod as desired through a very slight displacement thereof.

The drawer carries outwardly, at its center and at the level of its lower surface, a lantern 4 enclosing the illuminating means and at the level of its upper surface the object glass 5 and one of the mirrors 14. The positioning of the documents and the possibility of interchanging same require merely the opening of the drawer 11.

(D) A receiving device adjacent to the system disclosed and including a translucent screen 15 adapted to receive the projection in a plane perpendicular to the original documents and a plano-convex lens 16 that is larger than the projection it has to receive and is located at a suitable distance from the screen.

This lens has two parts of play: an increase in the magnification ratio without any increase of the bulk of the apparatus and the production between the screen and the lens of a camera obscura as obtained through the deflection of the outer rays or light under the action of the lens, which allows examination of the projection in broad day-light.

This receiving device comprises moreover a sunshade 17 and a shutter 18 for closing the opening in said sun-shade and serving at the same time as a switch for cutting out the electric light.

(E) A collapsing device 19 whereby it is possible at any moment to use for directing oneself or for defining an itinerary a second general map 20 which may appear behind the magnifying lens at the same time as a special lamp is illuminated.

(F) Suspending means 22 giving the system considered as a unit, the incline desired by the operator.

A cowl 23 covers the system disclosed.

These different arrangements may be modified in various manners of which some have been illustrated in Figs. 3 to 7.

Figure 4:
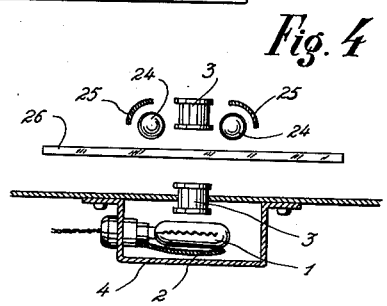
Fig. 4 illustrates two illuminating devices carried by the same apparatus and adapted to be used separately according to the case, the former for opaque documents and the latter for transparent documents. This apparatus allows reading the two types of documents and examining them clearly.

The illuminating means may include two lamps protected by reflectors 25 and projecting their beams on an opaque document 26 located underneath the optic system already described (Fig. 3) or else it may be duplicated and include simultaneously the above described members and those given out in Fig. 1: a condenser 3, a lamp 1, a mirror 2 and a lantern 4. This association of the two arrangements that may be used selectively alone or in combination, allows using indifferently opaque documents or transparent documents (Fig. 4).

Figure 5:
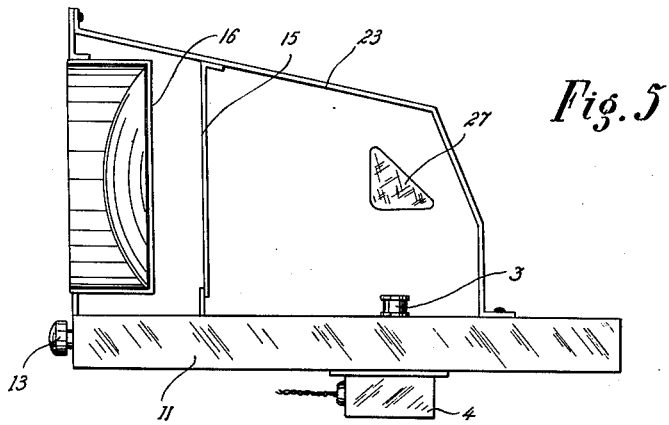
Fig. 5 shows an arrangement with a prism replacing the set of mirrors.

The projecting device may include a prism 27 instead of the set of mirrors 7 (Fig. 5).

Figure 6:
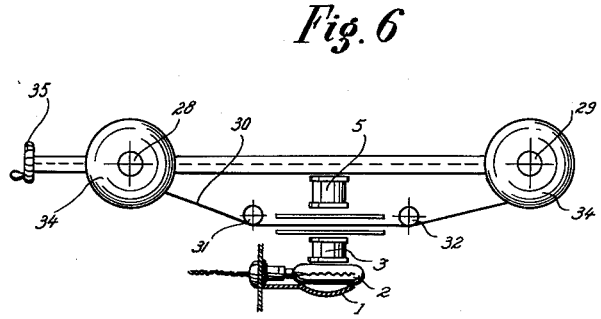
Fig. 6 shows a mechanism adapted to control the distribution of transparent or opaque documents in strip shape, including two spools respectively for feeding and take up purposes.

For the projection of documents on transparent or opaque strips, the mechanical arrangement will be constituted by two spools, one for unwinding the document at 28 and the other for winding it at 29; the strip-shaped document passes underneath the rollers 31 and 32 and inside a guide located between the illuminating and the projecting systems. Two knobs 34 provide for the progression of the strip in both directions over either spool. A crank 35 with a speed reduction allows a speedy rewinding for the change of strips (Fig. 6).

Figure 7:
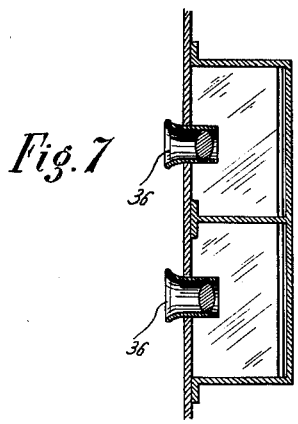
Fig. 7 shows an arrangement for the examination of stereoscopic documents.

The receiving device may include a stereoscopic arrangement 36 replacing the lens 16 for examining the stereomicrophotographic documents that are still visible on the translucent screen 15 (Fig. 7).

Lastly, said apparatus allows a further operation that is not apparent from the drawings, but will be easily understood:

It consists in projecting to the outside of the apparatus on a moving picture screen or the like suitable surface the documents to be examined; to this end, it is sufficient to remove the screen 15 and the magnifying glass 16 and to provide the projecting means with a suitable focusing system.

The microphotographic or stereomicrophotographic documents may be in black or color; they may be carried by rigid strips or appear under any other form; they may be obtained by any method whatever, whether photographic, lithographic, or the like.

The mechanical arrangement for the translational movement of the document may be designed so as to be capable of moving in all directions.

The scientific, educational and industrial applications of my improved apparatus are very numerous without any limitation being possible for any enumeration of such applications.

Obviously, the power of the source of light, its nature and the types of condensers, mirrors, object glasses, prisms, lenses or glasses and screens used may be modified according to applications and requirements. The shapes, sizes, and arrangements of the principal parts of the apparatuses and the material used for their manufacture may vary within wide limits without unduly widening thereby the principle of the invention as claimed in accompanying claims.

What I claim is:

1. In an apparatus for the inspection of maps and the like documents, the provision of an apertured casing, a frame adapted to carry the map, a drawer removably fitted inside the casing, a nut rigid with the frame, a micrometric screw rotatably carried by the drawer and engaging the nut on the frame, a rack carried by the frame perpendicularly to the axis of the nut and screw arrangement, a longitudinally fluted rod carried by the drawer in parallelism with the screw and engaging the rack for producing the movement of the frame in a direction parallel to said rack, a hand operated gear adapted to engage selectively the screw and the fluted rod for actuation thereof, means for illuminating the map carried by the lower part of the casing, a circuit feeding same and optical means through which the illuminating means form an image through the aperture in the casing of a small portion of the map registering with the illuminating means.

2. In an apparatus for the inspection of maps and the like documents, the provision of an apertured casing, a frame adapted to carry the map, a drawer removably fitted inside the casing, a hand operated mechanism for selectively shifting the frame in its drawer along two orthogonal axes of its plane through desired amounts, means for illuminating the map carried by the lower part of the casing, a circuit feeding same and optical means through which the illuminating means form an image through the aperture in the casing of a small portion of the map registering with the illuminating means, a translucent screen registering with the aperture in the casing and on which the image is projected, and a large plano-convex lens at a small distance in front of said screen through which visual examination of the image on the screen is made possible.

3. In an apparatus for the inspection of maps and the like documents, the provision of an apertured casing, a frame adapted to carry the map, a drawer removably fitted inside the casing, a hand operated mechanism for selectively shifting the frame in its drawer along two orthogonal axes of its plane through desired amounts, means for illuminating the map carried by the lower part of the casing, a circuit feeding same and optical means through which the illuminating means form an image through the aperture in the casing of a small portion of the map registering with the illuminating means, a translucent screen registering with the aperture in the casing and on which the image is projected, and a large plano-convex lens at a small distance in front of said screen through which visual examination of the image on the screen is made possible, a support for a general map pivotally secured to one edge of the screen and adapted to be rocked out of and into the plane of said screen and means for illuminating the general map on said support in its rocked screen-covering position.

4. In an apparatus for the inspection of maps and the like documents, the provision of an apertured casing, a frame adapted to carry the map, a drawer removably fitted inside the casing, a hand operated mechanism for selectively shifting the frame in its drawer along two orthogonal axes of its plane through desired amounts, means for illuminating the map carried by the lower part of the casing, a circuit feeding same and optical means through which the illuminating means form an image through the aperture in the casing of a small portion of the map registering with the illuminating means, a translucent screen registering with the aperture in the casing and on which the image is projected, and a large plano-convex lens at a small distance in front of said screen through which visual examination of the image on the screen is made possible, a shutter cooperating with the last mentioned lens and means whereby the closing of said shutter over the lens switches off the circuit feeding the illuminating means.

ABEL MARMOUR.

REFERENCES CITED

The following references are of record in the file of this patent:

UNITED STATES PATENTS

| Number | Name | Date |
|---|---|---|
| 1,358,685 | Friedman | Nov. 9, 1920 |
| 1,460,590 | Kucharski | July 3, 1923 |
| 1,808,725 | De Francisco | June 2, 1931 |
| 2,174,778 | Croft | Oct. 3, 1939 |
| 2,260,551 | Boni et al. | Oct. 28, 1941 |
| 2,267,649 | Graves | Dec. 23, 1941 |
| 2,271,296 | Hargrave et al. | Jan. 27, 1942 |
| 2,285,644 | Bernzott | June 9, 1942 |
| 2,407,009 | Holbrook | Sept. 3, 1946 |

FOREIGN PATENTS

| Number | Country | Date |
|---|---|---|
| 324,395 | Great Britain | Jan. 27, 1930 |